United States Patent [19]
White

[11] Patent Number: 5,291,906
[45] Date of Patent: Mar. 8, 1994

[54] AUTOMATIC VEHICLE CLEANING SYSTEM

[75] Inventor: Kenneth P. White, Burlington, N.C.

[73] Assignee: S.N.M. Manufacturing, Inc., Burlington, N.C.

[21] Appl. No.: 993,652

[22] Filed: Dec. 21, 1992

[51] Int. Cl.$^5$ .............................. B08B 3/02
[52] U.S. Cl. .................. 134/123; 134/172; 134/181; 239/263.1
[58] Field of Search .......... 134/45, 123, 172, 181; 239/752, 263

[56] References Cited

U.S. PATENT DOCUMENTS

| | | | |
|---|---|---|---|
| 3,496,908 | 2/1970 | Bernardi | 118/2 |
| 3,570,502 | 3/1971 | Farnsworth et al. | 134/45 |
| 4,809,720 | 3/1989 | Heraty | 134/45 |
| 4,957,126 | 9/1990 | Allaeys | 134/172 |
| 5,033,490 | 6/1991 | Wade et al. | 134/123 |

FOREIGN PATENT DOCUMENTS 2653399 4/1991 France .................. 134/45

*Primary Examiner*—Frankie L. Stinson
*Attorney, Agent, or Firm*—Macmillan, Sobanski & Todd

[57] ABSTRACT

An automatic vehicle cleaning system in which a spray bar is mounted on a trolley which moves on an overhead track around a vehicle stopped at a cleaning location. Rotating spray nozzles are mounted on the spray bar to spray the top and sides of the vehicle as the trolley advances around the vehicle. An indexing mechanism is provided for adjusting the spacing between the sides of the vehicle and the nozzles which spray the sides for accommodating different size vehicles with optimal cleaning efficiency. The spray bar may be indexed to any of four positions using two different length pneumatic or hydraulic cylinders connected end to end.

3 Claims, 3 Drawing Sheets

AUTOMATIC VEHICLE CLEANING SYSTEM

Technical Field

The invention relates to automatic vehicle cleaning systems of the type which are mounted on an overhead track to advance around a vehicle while spraying cleaning solutions and rinse water at the vehicle, and more particularly to an adjustable automatic cleaning device which accommodates different size vehicles.

BACKGROUND ART

Self serve car wash systems may be designed either for manual operation by manually moving a wand to first direct a high pressure spray of a detergent solution over the vehicle and then to direct a rinse spray of water over the vehicle, or the systems may be designed to automatically spray the vehicle with detergent and rinse water. Attention is directed to the automatic car wash system shown in U.S. Pat. No. 3,496,908 to Bernardi, the disclosure of which is incorporated herein. In that system, a vehicle is positioned under a generally rectangular overhead track which is larger than the plan dimensions of the vehicle. A motor drives a trolley along the track to move the trolley around the vehicle. As the trolley moves around the vehicle, a plurality of arms mounted on the trolley are rotated above the vehicle about a vertical axis. Nozzles on the rotating arms direct a high pressure spray at the top surfaces of the vehicle. A Second plurality of arms mounted on the trolley are rotated next to the side of the vehicle about a horizontal axis. Nozzles on the rotating second arms direct a high pressure spray at the sides of the vehicle. The trolley may be advanced around the vehicle four times during a cleaning cycle. During the first pass around the vehicle, a pre-soak detergent is applied to the vehicle at a relatively low pressure. During the second pass around the vehicle, detergent is directed at the vehicle surfaces at a high pressure. The revolving nozzles and the high fluid pressure produce a maximum impact to loosen dirt and film. During the third pass around the vehicle, a foamed wax may be applied to help break down the detergent and suspended soil on the vehicle. During the fourth pass around the vehicle, a high pressure clear water rinse is directed at the vehicle to remove all of the emulsified soils suspended during the previous steps. In areas which produce high dissolved solids, an optional fifth pass may be used to provide a spot free rinse for the vehicle.

Systems of the above described type provide a high quality cleaning. However, the quality of the cleaning will decrease as the spacing from the high pressure rotating nozzles to the vehicle surfaces increases. In particular, the cleaning efficiency on the sides of the vehicle will diminish with increase in the nozzle to vehicle surface spacing. A channel or track is formed at the floor on the drivers side of the vehicle under the overhead track. This channel guides the drivers side vehicle wheels to position the vehicle under the overhead track. A detector is mounted on the floor track for indicating when the drivers side front wheel is properly positioned with the vehicle under the overhead track. The width of the overhead track must be sized to accept the largest sized vehicles to be cleaned by the system. Consequently, for smaller vehicles, the rotating side cleaning nozzles can have an undesirably large spacing from the vehicle side and rear furthest from the wheel which is used to position the vehicle in the cleaning station.

DISCLOSURE OF INVENTION

According to the invention, a spray bar indexing mechanism is provided for an automatic vehicle washing system of the type shown in U.S. Pat. No. 3,496,908 to provide more optimum spacing between the rotating nozzles and the sides and ends of different size vehicles. A trolley is mounted on an overhead track to move around a vehicle during the cleaning cycle. An L-shaped spray bar is mounted on the trolley such that a horizontal side extends part way over the top of the vehicle and a vertical side extends generally parallel to the side of the vehicle. The spray bar is mounted on the trolley for movement along an axis parallel to the horizontal side so that the vertical side can be moved towards and away from the vehicle side. According to the invention, the size of a vehicle is detected prior to initiating the cleaning cycle and as the trolley moves around the vehicle during the cleaning cycle, an indexing mechanism moves the spray bar to provide a more uniform spacing between rotating nozzles mounted on the spray bar and the sides of the vehicle. The indexing mechanism includes two hydraulic or pneumatic cylinders which are of different lengths. By selectively extending and retracting the two cylinders, the spray bar is indexed to any of four different positions relative to the vehicle sides to provide a more optimal nozzle to vehicle surface spacing.

Accordingly, it is an object to provide an automatic indexing mechanism for adjusting the spacing between spray nozzles and the sides of a vehicle in a vehicle cleaning system.

Othere objects and advantages of the invention will become apparent from the following detailed description of the invention and the accompanying drawings.

BEST MODE FOR CARRYING OUT THE INVENTION

Figure 1:
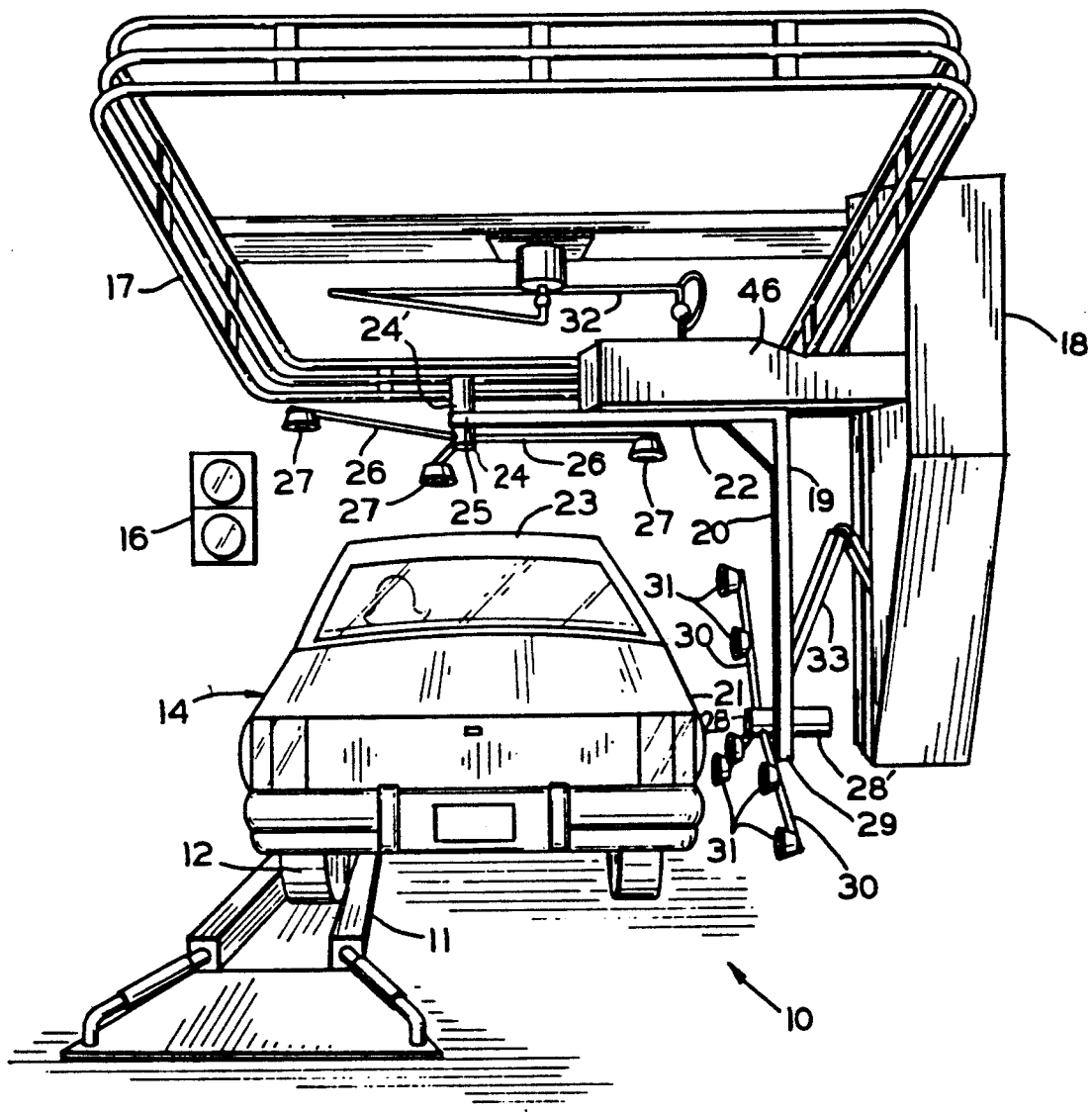
FIG. 1 is a rear perspective view of an adjustable automatic vehicle cleaning system according to a preferred embodiment of the invention.
Figure 2:
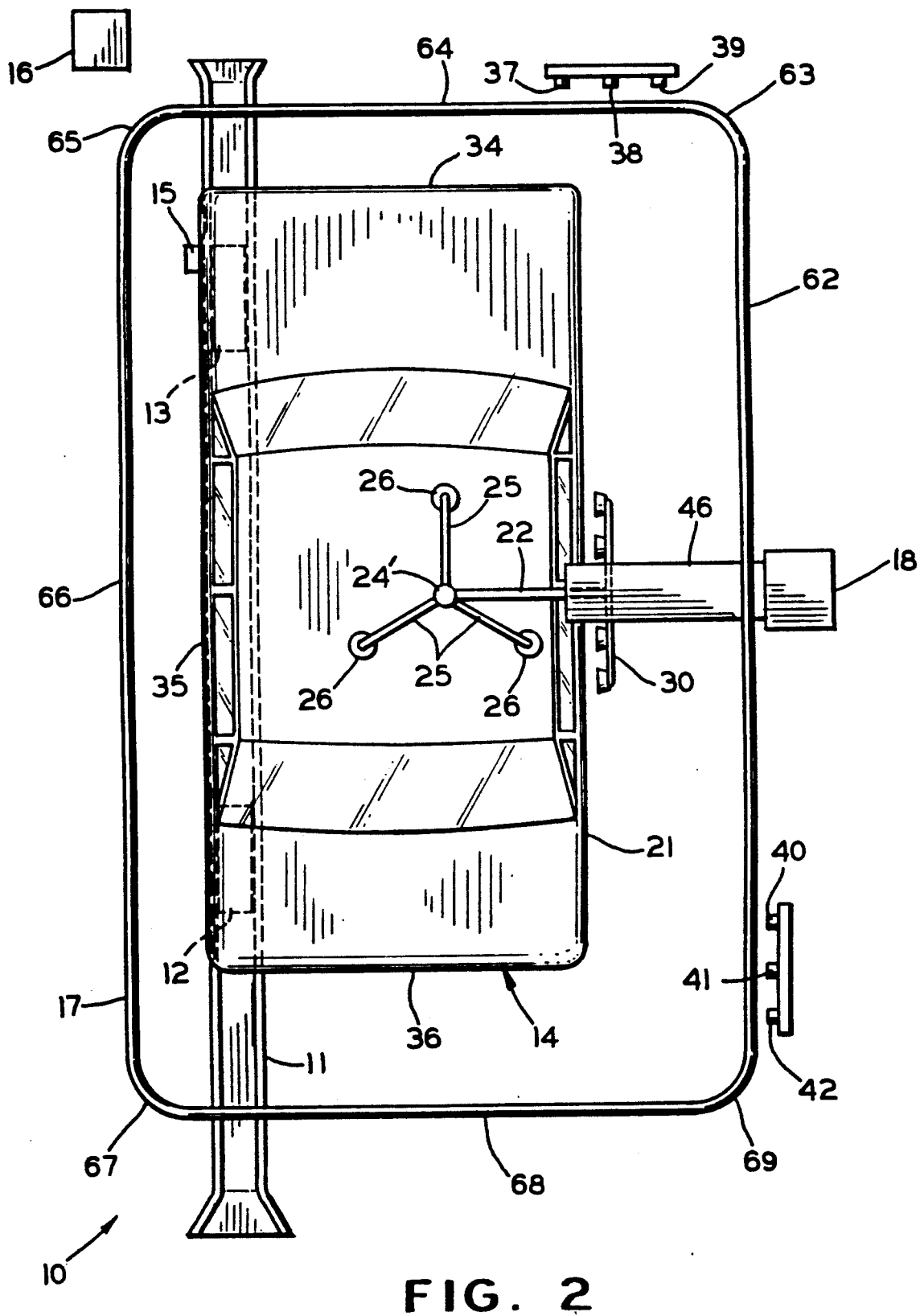
FIG. 2 is a top plan view of the system of claim 1, with the overhead fluid distributor omitted.

Referring to FIGS. 1 and 2 of the drawings, an automatic vehicle cleaning system 10 is illustrated according to a preferred embodiment of the invention. A floor track 11 receives rear and front wheels 12 and 13, respectively, on the left or drivers side of a vehicle 14 for positioning the vehicle 14 during cleaning. A switch or sensor 15 is mounted on or next to the track 11 for sensing when the front wheel 13 is at a predetermined location. When the wheel 13 is at the predetermined location, the vehicle is properly positioned for cleaning and the sensor 15 activates a light 16 to inform the driver that the car should be stopped and placed in either park or neutral. The wheel sensor 15 also starts the cleaning system 10 when the car is properly positioned at the cleaning location.

An overhead track 17 is mounted above the vehicle cleaning location. The overhead track 17 is generally rectangular with rounded corners and has dimensions greater the dimensions of the vehicle 14, as best seen in the plan view of FIG. 2. A trolley or carriage 18 is suspended from the overhead track 17. During a cleaning cycle, a motor (not shown) mounted in the trolley 18 causes the trolley 18 to move along the overhead track 17 around the vehicle 14. According to the invention, an L-shaped spray bar 19 is mounted on the trolley 18. The spray bar 19 has a vertical side 20 which extends generally parallel to an adjacent right side 21 of the vehicle 14 (when positioned as shown in FIGS. 1 and 2) and has a horizontal side 22 which extends over a top 23 of the vehicle 14. As will be described in detail below, the spray bar 19 is mounted on the trolley 18 for movement along an axis parallel to the longitudinal axis of the horizontal side 22. Thus, the vertical side 20 of the spray bar 19 is moveable towards and away from an adjacent vehicle side or end.

A rotary spray head 24 is mounted on a free end 25 of the horizontal spray bar side 22. Three spaced arms 26 project from the spray head 24 and each mounts one or more downwardly directed nozzles 27. The spray head 24 is rotated about a vertical axis so that the nozzles sweep over the vehicle top 23 as the trolley 18 is advanced around the vehicle 14. Similarly, a rotary spray head 28 is mounted on a free lower end 29 of the vertical spray bar side 20. Three spaced arms 30 project from the spray head 28 in a plane parallel to the adjacent vehicle side 21. One or more nozzles 31 mounted on each arm 30 are directed at the adjacent vehicle side 21. The spray head 28 is rotated about a horizontal axis which is generally perpendicular to the adjacent vehicle side or end so that the nozzles 31 sweep over the adjacent vehicle side or end. Hydraulic fluid is delivered through a conduit 33 to hydraulic motors 24' and 28' on the spray bar 19 which rotate the spray heads 24 and 28. As the spray heads 24 and 28 are rotated, fluid is delivered through a conduit 32 to the nozzles 26 and 31 to spray the vehicle 14 and, at the same time the trolley 18 is advanced around the overhead track 17. Consequently, during one complete cycle of the trolley 18 around the overhead track 17, all exposed surfaces of the vehicle 14 are sprayed.

As seen in the plan view of FIG. 2, the vehicle 14 has a right side 21, a front end 34, a left side 35 and a rear end 36. Normally, the front end 34 and the left side 35 of the vehicle 14 will be fairly accurately located when the sensor 15 detects the front wheel 13. There will be some spacing variations with different size vehicles. However, there may be significant location variations for the rear end 36 and for the right side 21 with different size vehicles because of their greater distance from the left front wheel 13. If the spray heads 24 and 28 are at fixed locations on the trolley 18, the overhead track 17 must be sized to accommodate the largest vehicles to be washed. For sub-compact vehicles, this may result in excessive spacing from the nozzles 31 and the sides and ends of the vehicle which they spray, especially for the right side 21 and the rear end 36.

According to the invention, the spray heads 24 and 28 are mounted on the spray bar 19 and the spray bar 19 is indexed to automatically position the spray head 28 relative to the vehicle 14 as the trolley 18 moves around the overhead tract 17. Three sensors 37–39 are mounted for determining the location of the right side 21 of the vehicle 14 relative to the floor track 11. The sensors 37–39 may be mounted at any convenient location to detect the right vehicle side 21 either as the vehicle 14 enters the cleaning location or after the vehicle 14 is stopped at the vehicle location. The three sensors 37–39 detect when the vehicle width falls within any of four ranges, namely, when the none of the sensors 37–39 is activated by a very small vehicle, when the vehicle width is sufficient to activate sensor 37, when the vehicle width is sufficient to activate sensors 37 and 38 and when the vehicle width is sufficiently large to activate all three sensors 37–39. Depending upon which of the four vehicle widths is detected, the spray bar 19 is indexed to one of 4 positions to adjust the spacing between the nozzles 31 and the adjacent vehicle side. At the same time the position of the side spray head 28 is adjusted, the position of the top spray head 24 is adjusted to accommodate different width vehicle tops 23.

A second set of three sensors 40–42 is positioned to detect the location of the rear end 36 of the vehicle 14 when the vehicle 14 is at the cleaning location. The sensors 40–42 indicate four vehicle length ranges. If desired, additional sensors (not shown) may be provided for sensing the location of the front end 34 and of the left side 35 of the vehicle. However, these measurements are less critical since the spacings of the front end 34 and of the left side 35 from the left front wheel 13 are smaller and will have less variation from vehicle to vehicle than for the right side 21 and the rear end 36.

Figure 3:
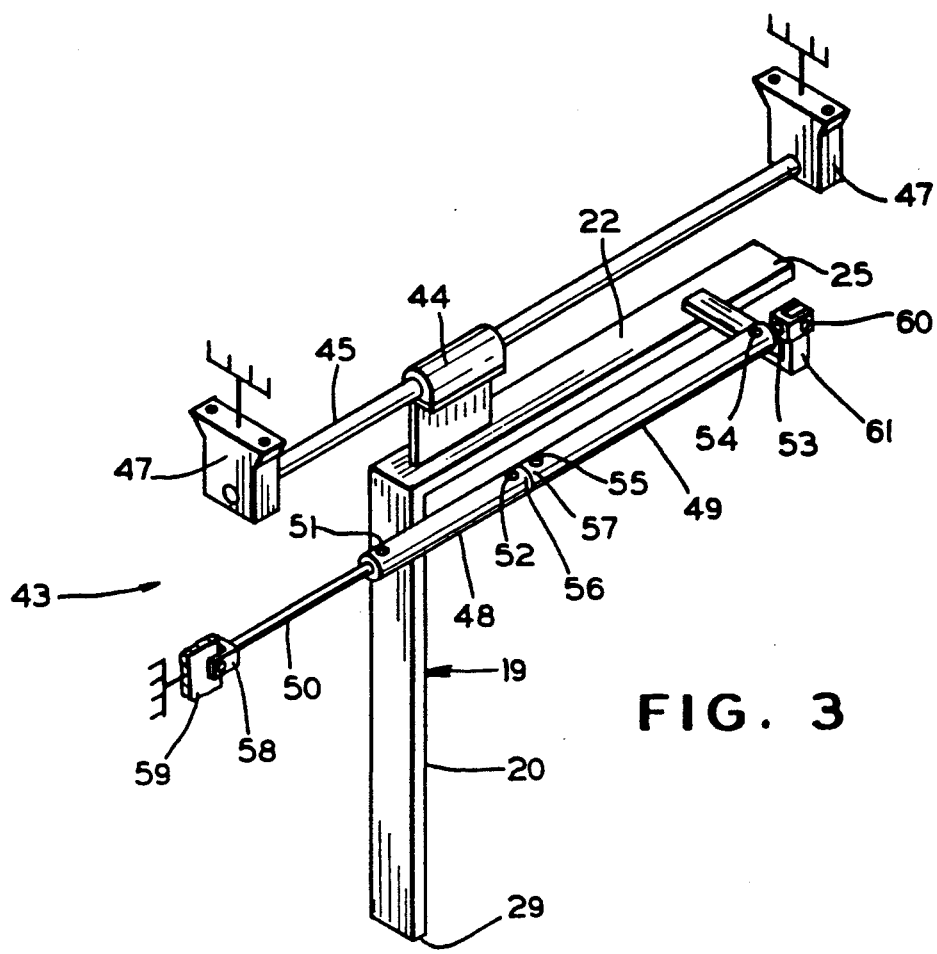
FIG. 3 is a diagrammatic perspective view showing details of the indexing mechanism for the spray bar.

FIG. 3 shows an indexing mechanism 43 for the spray bar 19. The spray bar 19 is supported by a linear bearing 44 which moves on a rod 45 secured to a boom 46 (FIGS. 1 and 2) on the trolley 18 by two brackets 47. It will be noted from FIG. 2 that as the trolley 18 moves around the overhead track 17, the boom 46 will always extend perpendicular to the track 17. The rod 45 extends parallel to the horizontal spray bar side 22 and is mounted on the boom 46 to also extend perpendicular to the overhead track 17. Consequently, the vertical side 20 of the spray bar is limited to movement towards and away from the adjacent side or end of a vehicle being washed.

The spray bar 19 is positioned on the rod 45 by two hydraulic or pneumatic cylinders 48 and 49. A piston rod 50 is retracted into the cylinder 48 by applying pressurized fluid to a fitting 51 and venting fluid through a fitting 52 and the piston rod 50 is extended from the cylinder 48 by applying pressurized fluid to the fitting 52 and venting fluid through the fitting 51. Similarly, a piston rod 53 is retracted into the cylinder 49 by applying pressurized fluid to a fitting 54 and venting fluid through a fitting 55 and the piston rod 53 is extended from the cylinder 49 by applying pressurized fluid to the fitting 55 and venting fluid through the fitting 54. Ends 56 and 57 of the cylinders 48 and 49, respectively, are connected together so that the piston rods 50 and 53 are axially aligned. An end 58 of the piston rod 50 is secured through a bracket 59 to the trolley 18 and an end 60 of the piston rod 53 is secured through a bracket 61 to the spray bar 19. Thus, the spray bar 19 is positioned on the rod 45 by selectively extending and retracting the piston rods 50 and 53.

In order to provide 4 discrete indexing positions for the spray bar 19, one of the cylinders 48 and 49 is longer than the other cylinder. In the illustrated embodiment, the cylinder 48 is shorter than the cylinder 49. By making the cylinder 49 twice as long as the cylinder 48, the four indexing positions for the spray bar 19 will be equally spaced.

Figure 4:
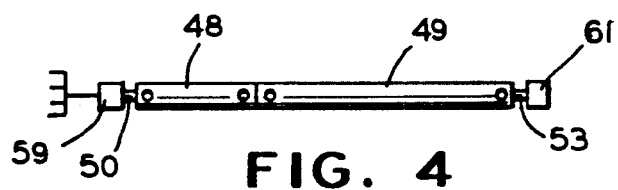
FIG. 4 is a diagrammatic view showing the spray bar indexing mechanism with both cylinders retracted.
Figure 5:
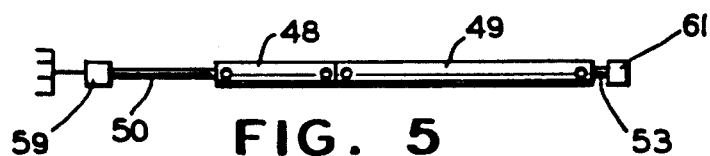
FIG. 5 is a diagrammatic view showing the spray bar indexing mechanism with the shorter cylinder extended and the longer cylinder retracted.
Figure 6:
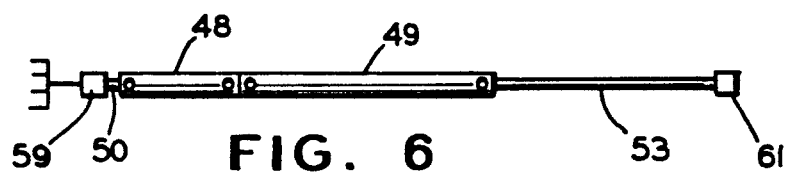
FIG. 6 is a diagrammatic view showing the spray bar indexing mechanism with the longer cylinder extended and the shorter cylinder retracted.
Figure 7:
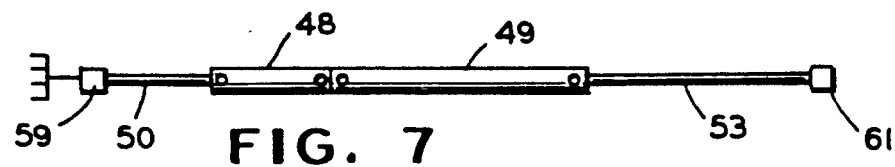
FIG. 7 is a diagrammatic view showing the spray bar indexing mechanism with both the shorter cylinder and the longer cylinder extended.

The manner in which the spray bar 19 is indexed by the two cylinders is illustrated in FIGS. 4–7. In FIG. 4, both piston rods 50 and 53 are fully retracted and the spray bar 19 will be positioned for cleaning the largest sized vehicles. In FIG. 5, the shorter piston rod 50 is extended and the longer piston rod 53 is retracted to position the spray bar 19 for cleaning slightly smaller vehicles. In FIG. 6, the shorter piston rod 50 is retracted and the longer piston rod 53 is extended to position the spray bar 19 for cleaning still smaller vehicles. Finally, in FIG. 7 both of the piston rods 50 and 53 are extended to position the spray bar 19 for cleaning the smallest size vehicles.

Referring again to FIG. 2, it will be seen that the overhead track 17 has a right side 62 connected through a corner 63 to a front side 64, which is connected through a corner 65 to a left side 66, which is connected through a corner 67 to a rear side 68, which is connected through a corner 69 to the right side 62 to form an endless track. As the trolley 18 advanced around the track 17, for example in a counterclockwise direction in FIG. 2, the position of the spray bar 19 may be indexed as the trolley goes around each corner 63, 65, 67 and 69, or it may be indexed immediately prior to or immediately subsequent to going around each corner to provide the desired spacing for the side spray nozzles 31.

It will be appreciated that various modifications and changes may be made to the above described preferred embodiment of an automatic vehicle cleaning system without departing from the spirit and the scope of the following claims. For example, the number of arms and the number of nozzles on each arm for the spray heads 24 and 28 are not critical to the invention. Further, in the broadest aspects of the invention, the indexing mechanism may be used with a spray head which sprays only the sides and ends of a vehicle and a different mechanism may be used for washing the top of the vehicle.

I claim:

1. Apparatus for cleaning a vehicle while the vehicle is at a cleaning location which includes an overhead track mounted above and surrounding said cleaning location, a trolley mounted to move on said overhead track around said cleaning location, said trolley including a guide mounted to extend from said trolley along a horizontal axis substantially perpendicular to said overhead track, a plurality of spray nozzles mounted on said trolley to spray sides of a vehicle at said cleaning location as said trolley is advanced around said overhead track, said apparatus characterized by means for determining the location of at least one side of such vehicle relative to an adjacent side of said track, and means responsive to the determined location of said at least one side for adjusting the spacing between said spray nozzles and such vehicle side as said trolley is advanced along such side, said adjusting means including a spray bar mounting said spray nozzles, means mounting said spray bar on said guide to move along said guide axis, first and second cylinders, said first cylinder having a first end connected to a first end of said second cylinder with said cylinders having a common axis, a first piston rod extending from said first cylinder along said axis to form a second end of said first cylinder, a second piston rod extending from said second cylinder along said axis to form a second end of said second cylinder, means for selectively supplying fluid to said first cylinder for selectively extending and retracting said first piston rod from said first cylinder along said axis, means for selectively supplying fluid to said second cylinder for selectively extending and retracting said second piston rod from said second cylinder along said axis, means for connecting said second end of said first cylinder to said trolley and means for connecting said second end of said second cylinder to said spray bar, whereby the position of said spray bar is indexed on said guide by selectively extending and retracting said first and second piston rods.

2. Apparatus for cleaning a vehicle, as set forth in claim 1, and wherein one of said first and second cylinders is substantially twice the length of the other of said cylinders.

3. Apparatus for cleaning a vehicle, as set forth in claim 2, wherein said spray bar is L-shaped and has a vertical side and a horizontal side extending over a portion of a top of a vehicle stopped at said cleaning location, side spray head means mounted on said vertical side for rotating said plurality of spray nozzles about a horizontal axis for spraying sides and ends of such vehicle, a second plurality of spray nozzles directed downwardly, and top spray head means mounted on said horizontal spray bar side for rotating said second plurality of nozzles about a vertical axis for spraying the top of such vehicle.

* * * * *